United States Patent [19]
Itoh et al.

[11] Patent Number: 5,497,433
[45] Date of Patent: Mar. 5, 1996

[54] OPTICAL INFORMATION PROCESSING APPARATUS AND METHOD FOR USING COMPUTER GENERATED HOLOGRAM

[75] Inventors: Masami Itoh, Takarazuka; Kanji Nishii, Osaka; Hiroyuki Kawamura, Kadoma; Atsushi Fukui, Hirakata, all of Japan

[73] Assignee: Matsushita Electric Industrial Co., Ltd., Osaka, Japan

[21] Appl. No.: 440,236

[22] Filed: May 12, 1995

Related U.S. Application Data

[60] Continuation of Ser. No. 136,250, Oct. 15, 1993, abandoned, which is a division of Ser. No. 967,739, Oct. 28, 1992, Pat. No. 5,386,378, which is a continuation-in-part of Ser. No. 710,461, Jun. 5, 1991, abandoned.

[30] Foreign Application Priority Data

Jun. 5, 1990 [JP] Japan .................................... 2-148242

[51] Int. Cl.[6] ............................... G06K 9/76; G06E 3/00
[52] U.S. Cl. ............................................. 382/211; 364/822
[58] Field of Search .................................... 382/209, 210, 382/211, 216, 217, 218; 359/29, 559, 561; 364/822, 515

[56] References Cited

U.S. PATENT DOCUMENTS

| | | | |
|---|---|---|---|
| 4,084,255 | 4/1978 | Casasent et al. | 359/561 |
| 4,832,447 | 5/1989 | Javidi | 359/561 |
| 4,838,644 | 6/1989 | Ochoa et al. | 382/31 |
| 5,220,622 | 6/1993 | Scarr | 382/31 |
| 5,257,322 | 10/1993 | Matsuoka et al. | 382/31 |

*Primary Examiner*—Joseph Mancuso
*Assistant Examiner*—Gerard Del Rosso
*Attorney, Agent, or Firm*—Wenderoth, Lind & Ponack

[57] ABSTRACT

An input image of an object is optically Fourier-transformed and after coordinate-transforming the Fourier-transformed input image optically to obtain a rotation-invariant and scale-invariant image, the resultant image is pattern-matched with a computer generated hologram of a reference image. The coordinate-transformation of the Fourier-transformed input image is made using an optical phase filter represented as a computer generated hologram.

10 Claims, 15 Drawing Sheets

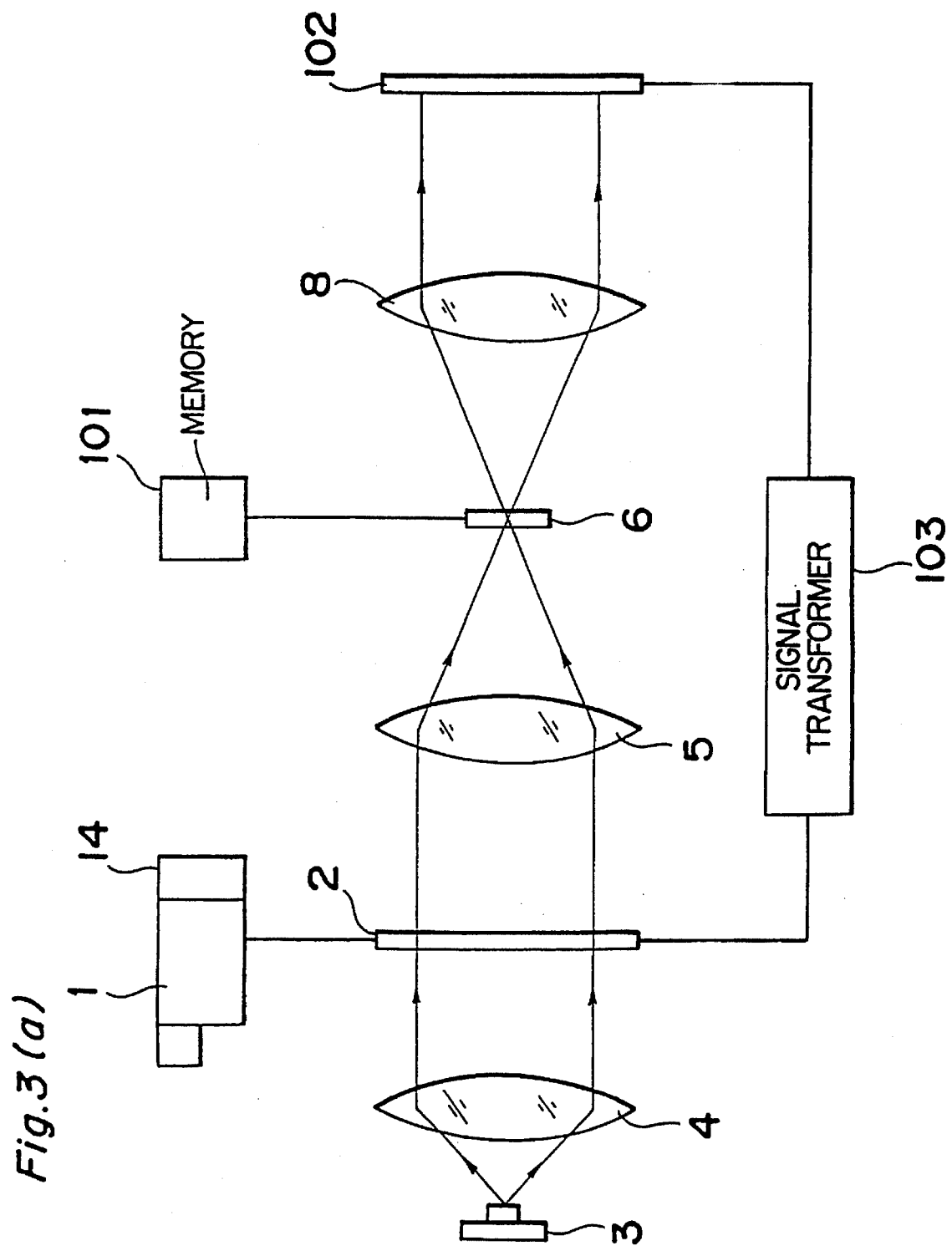

OPTICAL INFORMATION PROCESSING APPARATUS AND METHOD FOR USING COMPUTER GENERATED HOLOGRAM

CROSS-REFERENCE TO RELATED APPLICATIONS

This application is a Continuation of now abandoned application Ser. No. 08/136,250, filed Oct. 15, 1993, which is a Divisional of application Ser. No. 07/967,739, filed Oct. 28, 1992, which in turn is a continuation-in-part application of U.S. Patent application Ser. No. 07/710,461, filed Jun. 5, 1991, now abandoned entitled "OPTICAL INFORMATION PROCESSING APPARATUS AND METHOD USING COMPUTER GENERATED HOLOGRAM".

BACKGROUND OF THE INVENTION

1. Field of the Invention

The present invention relates to an optical information processing apparatus and method for an image sensing device of an industrial robot or the like which carries out filtering of an input image in a spatial frequency range, image processing such as feature extraction or the like, or discriminating an input pattern coincident with a specific reference pattern among a plurality of input images.

2. Description of the Prior Art

A conventional optical information processing apparatus of this type is disclosed, for example, in Japanese Patent laid-open publication No. H2-132412.

FIG. 7 shows a fundamental composition thereof.

In this apparatus, when an object is picked up by a TV camera 401, the image thereof is displayed on a first liquid crystal display 402 which is irradiated by a coherent light emitted from a laser diode 403 and collimated by a collimator lens 404. Since the first liquid crystal display 402 is arranged in the front focal plane of a first lens 405, a Fourier transformed image of the object is formed on a second liquid crystal displayed 406 arranged in the rear local plane of the first lens 405. At this time, a Fourier transformed image of a specific reference pattern is simultaneously displayed as an optical filter on the second liquid crystal display 406 in a form of a Fourier transformation computer generated hologram by modulating spatially the transmittance of each pixel thereof using data related to the specific reference pattern which is memorized in a ROM 407. Accordingly, the Fourier transformed images of the object and the specific reference image are superposed on the second liquid crystal display 406.

Since the second liquid crystal display is arranged in the front plane of a second lens 408, these Fourier transformed images are optically Fourier transformed by the second lens 408. If both Fourier transformed images on the second display 406 coincide with each other, a bright point is generated on a rear focal plane of the second lens 408 and is detected by a photodetector 409. Thus, the object is discriminated by detecting the bright point.

However, in the conventional apparatus mentioned above, it is impossible to perform an exact pattern matching in a case in which an object is varied in the scale thereof or rotated since correlation factors between the images of the object and the reference pattern are varied thereby.

In order to solve this problem, D. Casasent et. al., proposed to perform a pattern matching between the image of the object and the reference pattern after executing a coordinate transformation of the image of the object which is invariant to variation in the scale thereof or rotation thereof [See D. Casasent et. al., Appl. Opt. 26,938 (1987)].

However, according to the composition proposed by D. Casasent et. al., a plurality of input patterns have to be interchanged in turn and, also, it becomes necessary to interchange a plurality of phase filters for coordinate transformation in turn upon performing plural coordinate transformations. However, since it becomes necessary to position each phase filter at an extremely high accuracy, real-time processing for the coordinate transformation of the input pattern is impossible, resulting in a lack of flexibility.

Furthermore, the apparatus of this type has a disadvantage in that it is difficult to recognize an object exactly when the object is moved parallel to the origin of a logarithmic polar coordinate since scale and rotation invariance is obtained only in a case that the center of the object coincides with the origin of the above coordinate.

This will be explained below using FIGS. 8 and 9.

In FIG. 8(b) shows a pattern obtained by rotating pattern of FIG. 8(a) by 90° about the coordinate origin FIG. 8(c) shows a pattern obtained by magnifying the pattern of FIG. 8(a) by k-times and FIG. 8(d) shows a pattern obtained by shifting the pattern of FIG. 8(a) in the x-direction by a distance m. In FIGS. 9(a) 9(b), 9(c) and 9(d) show patterns obtained by logarithmic polar coordinate transforming patterns of the patterns of FIGS. 8(a), 8(b), 8(c) and 8(d) of FIG. 8. As is apparent FIG. 9(b), the patterns of (b) and FIG. 9(c) are obtained by parallel-shifting the pattern of FIG. 9(a). Since the shift invariance is maintained in the pattern matching with use of a Fourier transforming optical system, patterns of FIGS. 8(a), 8(b) and 8(c) are recognized as the same and, accordingly, the scale and rotation invariance is maintained at the origin. However, the pattern of FIG. 9(d) being the pattern obtained from the pattern of FIG. 8(d) is quite different from the pattern of FIG. 9(a) and, accordingly, the former is not recognized as the same as the latter.

SUMMARY OF THE INVENTION

One object of the present invention is to provide an optical information processing apparatus and method which is able to process optical information in real-time and, accordingly, to afford great flexibility.

Another object of the present invention is to provide an optical information processing apparatus and method capable of recognizing a target object exactly even if it is shifted parallel to the origin of a coordinate of the system.

A further object of the present invention is to provide an optical information processing apparatus and method capable of measuring an angle of rotation of and distance to a target object.

To accomplish these objects, according to the present invention, an input image of a target object is optically Fourier-transformed at first and, then, the Fourier-transformed image is logarithmic polar coordinate-transformed. Pattern matching is made to the resultant image of the input image by comparing the same with images obtained by transforming reference images in a similar manner as above.

Thus, according to the present invention, the correlation factor between the input image and the reference image is kept unchanged even if the object is rotated or parallel-shifted or the input image is varied in scale.

The coordinate-transformation for the input image is made as a real-time processing by displaying an optical phase filter therefor such as a computer generated hologram on the second spatial light modulator.

According to one aspect of the present invention, the Fourier-transformation and coordinate-transformation regarding reference patterns can be made beforehand using a computer. Data thus obtained are memorized in a memory, and it becomes possible to obtain an optical image necessary for comparing with the coordinate-transformed image of the Fourier-transformed image of an input image on the spatial light modulator directly.

Further, according to another aspect of the present invention, the rotation angle of an object and/or distance thereto can be measured by detecting the maximum correlation value between two images while rotating and/or zooming the image input means relative to the object.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

[First preferred embodiment]

Figure 1A:
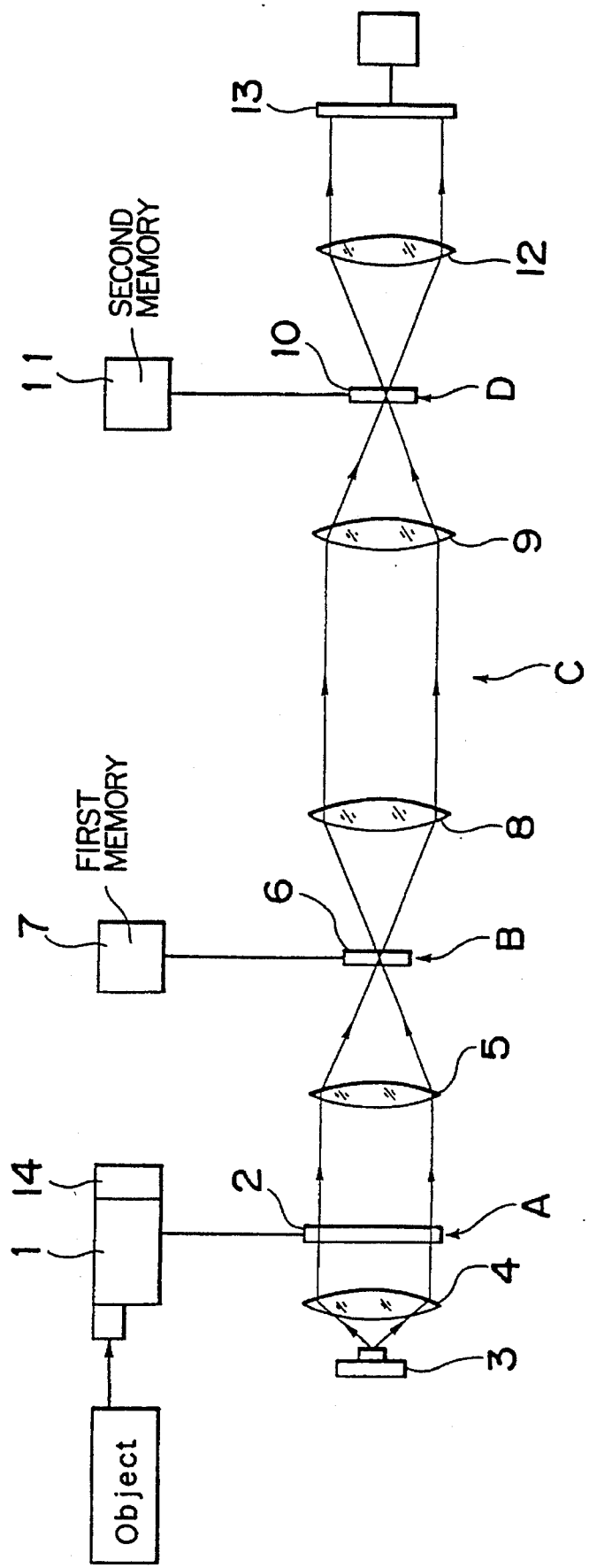
FIG. 1(a) is a block diagram showing an optical information processing apparatus according to a first preferred embodiment of the present invention.

FIG. 1(a) is a block diagram for showing a fundamental composition of an optical information processing apparatus according to a first preferred embodiment of the present invention.

In FIG. 1, a reference numeral 1(a) indicates a TV camera capable of varying a zooming ratio, 2 indicates a first liquid crystal display which displays the image of an object picked up by said camera 1, 3 indicates a laser diode, 4 indicates a collimator lens which collimates the laser light emitted from said laser diode 3, and 5 indicates a first lens. The first liquid crystal display 2 is arranged on the front focal plane of the first lens 5. A second liquid crystal display 6 is arranged on the rear focal plane of the first lens 5. A reference numeral 7 indicates a first memory which memorizes data of coordinate transformation computer generated holograms calculated for plural coordinate transformations with sampling points of respective pixels on the second liquid crystal display 6. In other words, voltage data to be applied corresponding to transmittances of individual pixels of the second display have been written into said first memory 7. A reference numeral 8 indicates a second lens and on the front focal plane thereof, said second liquid crystal display 6 is arranged. Further, a reference numeral 9 is a third lens arranged so as to have the front focal plane which coincides with the rear focal plane of the second lens 8, 10 indicates a third liquid crystal display arranged on the rear focal plane of the third lens 9, and 11 indicates a second memory which memorizes data of Fourier transformation computer generated holograms calculated for plural reference patterns with sampling points of respective pixels on the third liquid crystal display 10. In other words, voltage data to be applied corresponding to transmittances of individual pixels of the third display 10 have been written into said second memory 11.

Further, reference numeral 12, 13 and 14 indicate a fourth lens having a front focal plane on the third liquid crystal display 10, a photoelectric transforming device arranged on the rear focal plane of the fourth lens and a device for rotating the TV camera, respectively.

Figure 1B:
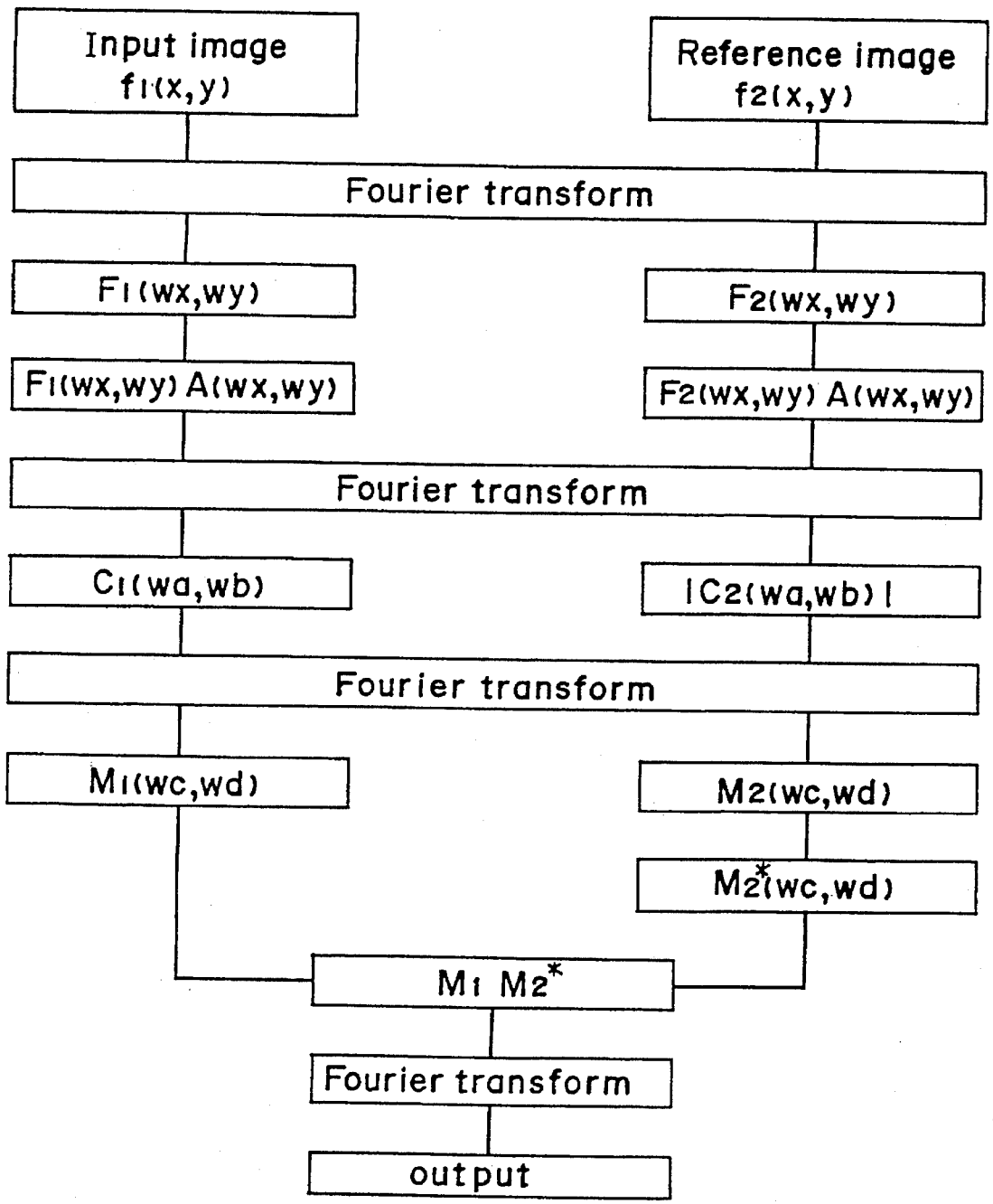
FIG. 1(b) is a flow chart showing an operation executed by the first preferred embodiment.

The operation of the optical information processing apparatus according to the first preferred embodiment, is explained below with reference to a flow chart shown in FIG. 1(b).

At first, when the image of an object is picked up by the TV camera 1, the same image f1(x,y) is displayed on the first liquid crystal display 2.

Figure 2A:
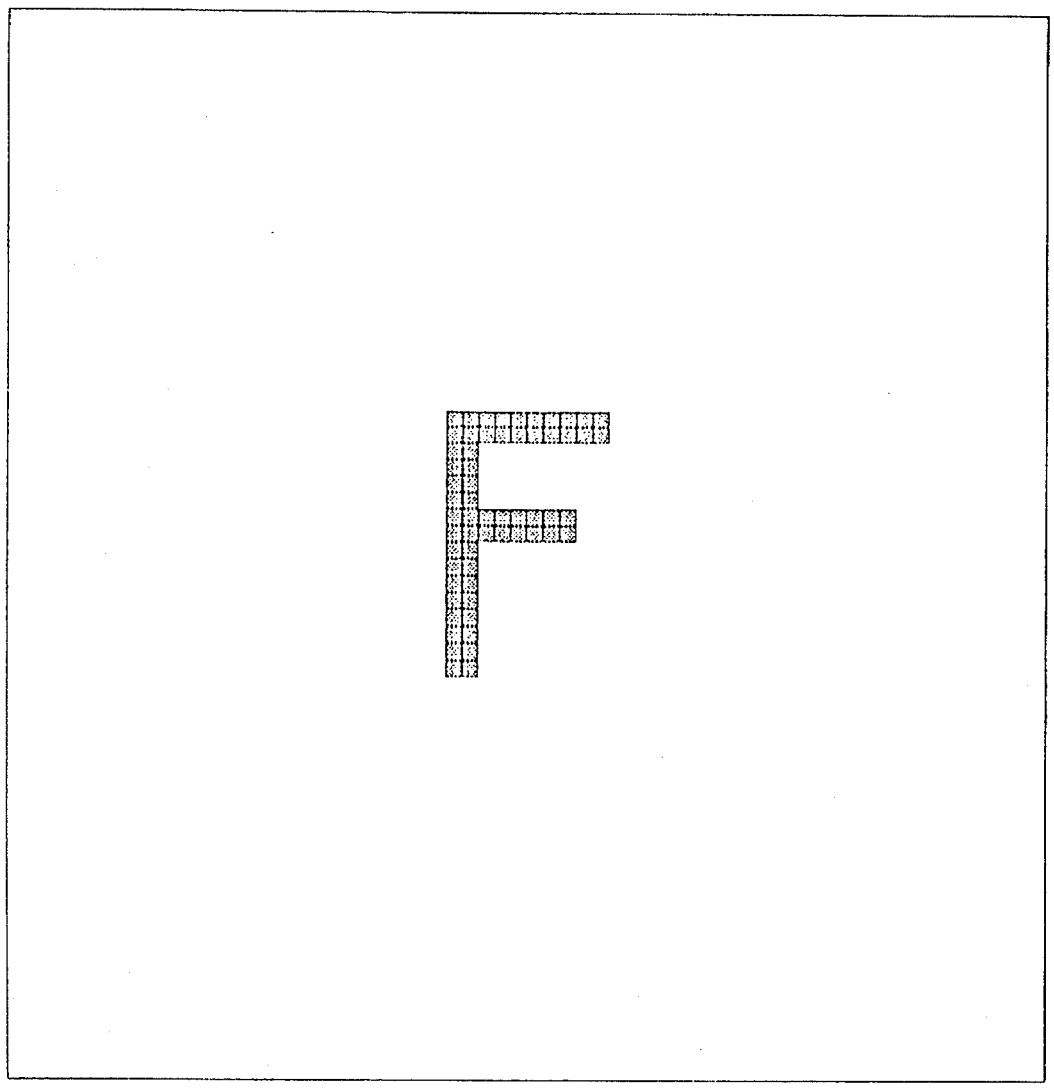
FIGS. 2(A), 2(B), 2(C) and 2(D) are plan views for showing optical images at positions A, B, C and D indicated in FIG. 1, FIGS. 3(a), 4, 5(a), and 6 are block diagrams showing optical information processing apparatus according to second to fifth preferred embodiments of the present invention, respectively.

For instance, when the object is character "F" as shown in FIG. 2(A), the character F itself is displayed on the first liquid crystal display 2.

This first liquid crystal display 2 is irradiated by a coherent light emitted from the laser diode 3 and collimated by the first collimator lens 4. Since it is arranged on the front focal plane of the first lens 5, a Fourier transformed image F1 (wx,wy) of the object optically transformed by the first lens 5 (which corresponds to first complex amplitude information) is formed on the rear focal plane of the first lens 5, namely, on the second liquid crystal display 6 by the first lens 5.

Figure 2B:
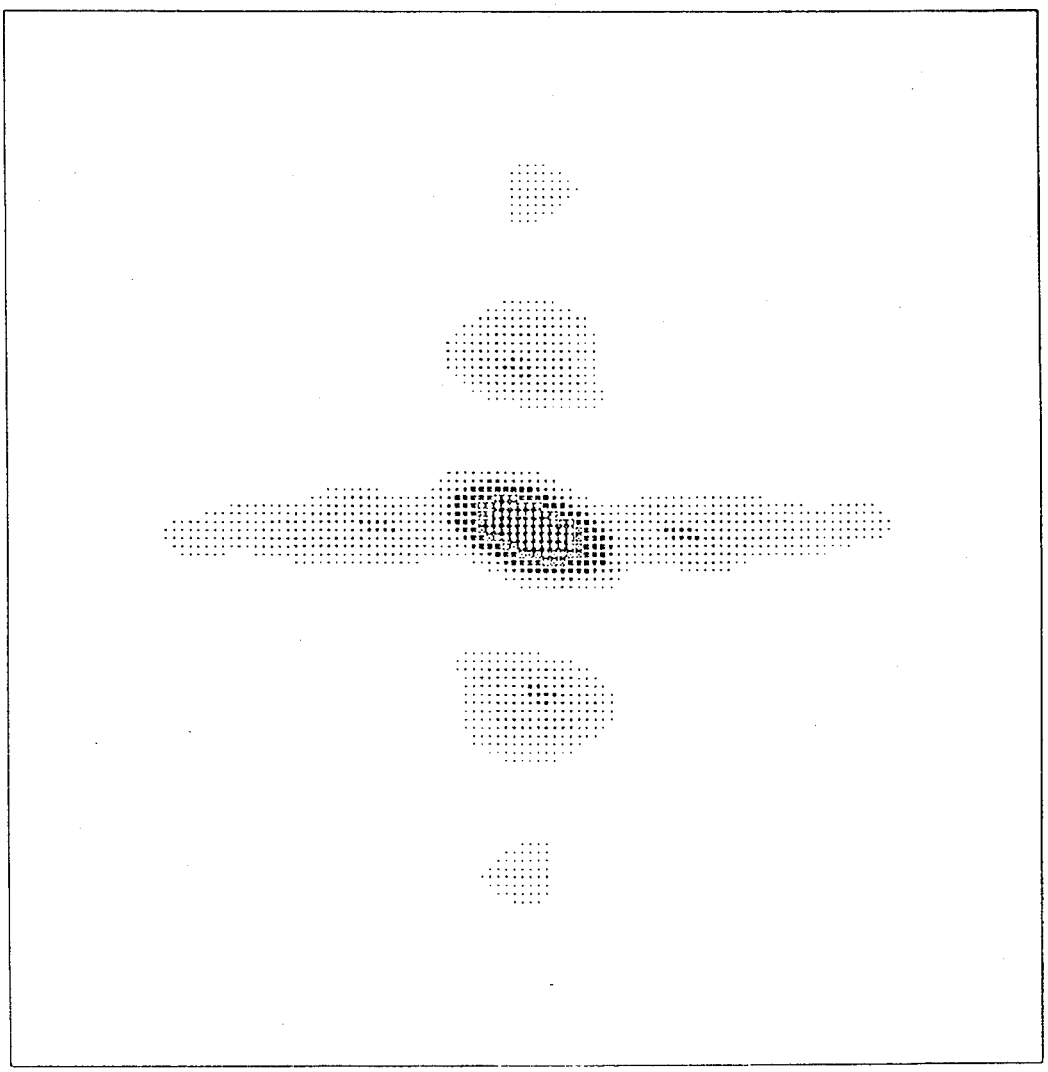

For instance, FIG. 2(B) shows an intensity distribution |F1 (wx,wy)|² of the Fourier transformed image of character "F". In FIG. 2(B), each size of a dot indicates the magnitude of a light intensity thereat.

At the same time, on the second liquid crystal display 6, phase information $A(wx,wy)=\exp[2\pi i/(f_L\lambda)\{wx\ln(wx^2+wy^2)^{1/2}-wy\tan^{-1}(wy/wx)-wx\}]$, when a logarithmic polar coordinate transformation is performed, for example, is displayed in a form of a computer generated hologram by modulating transmittances of respective pixels of the second liquid crystal display 6 spatially using the data written into the first memory 7 as input signals.

In the above equation, $f_L$ denotes a focal length of the second lens 8 and λ denotes a wavelength of the laser diode 3.

Accordingly, the Fourier transformed image F1(wx,wy) of the object displayed on the first liquid crystal display 2 and the phase information A(wx wy) are superposed on the second liquid crystal display 6 and, thereby, third complex amplitude information F1(wx,wy) × A(wx,wy) is formed.

Figure 2C:
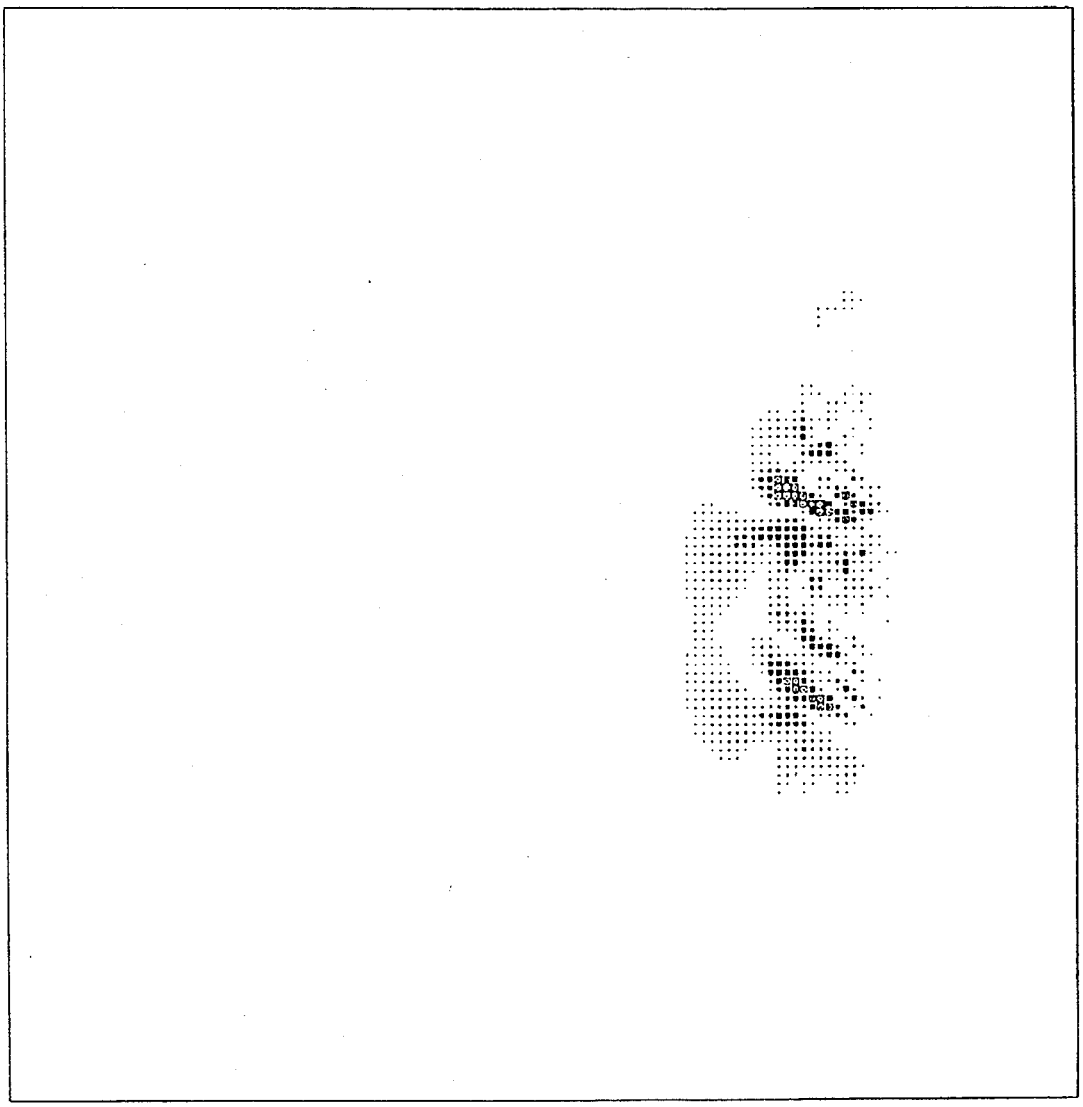

Further, since the second liquid crystal display 6 is arranged on the front focal plane of the second lens 8, the third complex amplitude information F1(wx,wy) × A(wx, wy) is optically Fourier-transformed by the second lens 8 and, thereby, a logarithmic polar coordinate transformed image C1(wa,wb) of the Fourier-transformed image F1(wx, wy) of the object, which corresponds to fifth complex amplitude information, is formed on the rear focal plane of the second lens 8. FIG. 2(C) shows an intensity distribution $|C1(wa,wb)|^2$ of $C1(wa,wb)$ of the Fourier-transformed image $F1(wx,wy)$ of character "F". In FIG. 2(C), the size of each dot indicates a magnitude of the light intensity thereat.

Figure 2D:
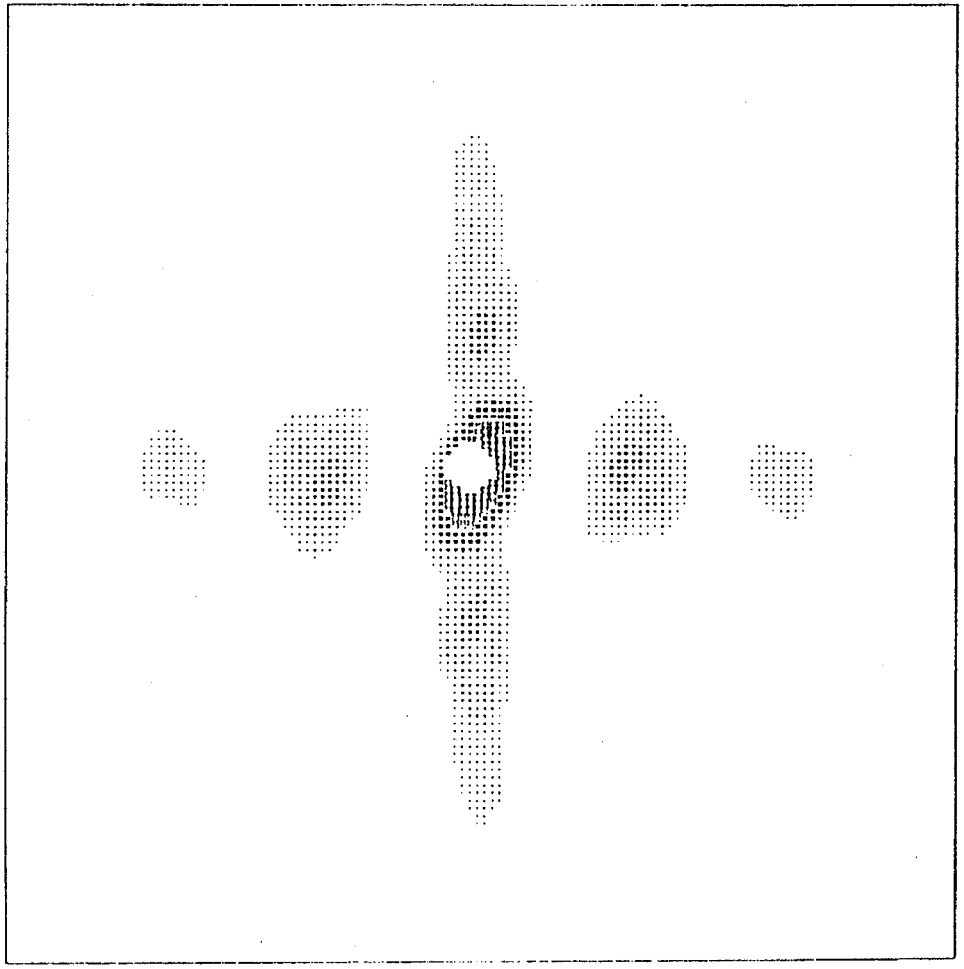

Since the rear focal plane of the second lens 8 is arranged on the front focal plane of the third lens 9, a Fourier-transformed image $M1(wc,wd)$ of the fifth complex amplitude information $C1(wa,wb)$, which corresponds to seventh complex amplitude information, is formed on the rear focal plane of the third lens 9, namely, the third liquid crystal display 10. FIG. 2 (D) shows an intensity distribution $|M1(wc,wd)|^2$ of seventh complex amplitude information $M1(wc,wd)$ which is formed from character "F" as an object $f1(w,y)$. In FIG. 2(D), the size of each dot indicates a magnitude of the light intensity thereat.

At the same time, on the third liquid crystal display 10, a complex conjugate $M2^*(wc,wd)$ of eighth complex amplitude information $M2(wc,wd)$ which is formed by the computer beforehand is displayed.

Next, a method for forming the eighth complex amplitude information is explained.

At first, a reference image $f2(x,y)$ is formed by fetching the same from the TV camera to the computer or by the computer. Then, second complex amplitude information $F2(wx,wy)$ is formed by Fourier-transforming $f2(x,y)$ by the computer using FFT or the like. Next, after forming fourth complex amplitude information $F2(wx,wy) \times A(wx,wy)$ by superposing the phase information $A(wx,wy)$ and the second complex amplitude information $F2(wx,wy)$, sixth complex amplitude information $C2(wa,wb)$ is formed by Fourier-transforming the fourth complex amplitude information. Then, the absolute value of the sixth amplitude information is Fourier-transformed again to form eighth complex amplitude information $M2(wc,wd)$.

Next, a method for displaying the complex conjugate $M2^*(wc,wd)$ of the eighth complex amplitude information on the third liquid crystal display will be explained. When the computer hologram with use of diffraction issued, a computer generated hologram is formed using the eighth complex amplitude information or the complex conjugate thereof and displayed on the third liquid crystal display 10. And, when a collimated light is irradiated on the third liquid crystal display 10, a first or minus first order of the diffracted light is complex conjugate to the eighth complex amplitude information. Alternatively, when a computer hologram which modulates a transmitted light directly is used, a computer hologram is generated based on a complex conjugate of the eighth complex amplitude information and displayed on the third liquid crystal display 10. And, when a collimated light is irradiated onto the third liquid crystal display 10, the light transmitted therethrough is complex conjugate to the eighth complex amplitude information.

The complex conjugate $M2^*(wc,wd)$ of the eighth complex amplitude information and the seventh complex amplitude information $M1(wc,wd)$ are superposed on the third liquid crystal display 10 and, thereby, ninth complex amplitude information $M1(wc,wd) \times M2^*(wc,wd)$ is formed.

Further, since the third liquid crystal display 10 is arranged on the front focal plane of the fourth lens 12, the ninth complex amplitude information $M1(wc,wd) \times M2^*(wc,wd)$ is Fourier-transformed by the fourth lens 12. Accordingly, a correlation calculation between the fifth and the sixth complex amplitude information $C1(wa,wb)$ and $C2(wa,wb)$ is performed optically, as is known as the correlation principle of the Fourier-transform, the result thereby is detected by a photo detector 13 arranged on the rear focal plane of the fourth lens 12. According to the first preferred embodiment, an object image is optically Fourier-transformed at first and the Fourier transformed image is pattern-matched with a reference pattern after performing a logarithmic polar coordinate transformation to the former. Therefore, correlation values with the reference pattern are kept unchanged even if the object is rotated or parallel-displaced or the scale thereof is changed.

Further, it becomes possible to easily transform an input pattern on real time by displaying the image picked up by the TV camera 1 on the first liquid crystal display 2. Furthermore, since it is possible to form phase filters in turn on the second liquid crystal display 6 in real time by modulating transmittances of respective pixels spatially according to the phase information for performing plural coordinate transformations which have been written in the first memory 7 beforehand, the real-time capability and flexibility of the optical information processing apparatus are highly enhanced.

When the pattern matching with the reference pattern having been recognized is performed after executing a coordinate transformation capable of keeping the correlation value with the reference pattern unchanged, for example, a logarithmic transformation while rotating the TV camera 1 by the rotation device 14, the correlation value varies as the TV camera rotates. When the correlation value becomes maximum, a rotation angle between the object and the reference pattern becomes equal to zero. Accordingly, it becomes possible to detect the rotation angle of the object by measuring a rotation angle of the TV camera 1 from the initial position to a position at which the correlation value becomes maximum using, for example, an encoder.

Further, when the pattern matching with the recognized reference pattern is performed while varying the zooming ratio of the TV camera 1 without any coordinate transformation by lighting the whole of the second liquid crystal display 6, the correlation value is varied according to the zooming ratio. When the correlation value becomes maximum, the magnitude of an object image coincides with that of the recognized reference pattern. Accordingly, the magnitude of the input object image can be obtained from the initial zooming ratio and that corresponding to the maximum correlation value.

Since the magnitude of an object image picked up by the TV camera varies depending on a distance from the object to the TV camera, the distance can be calculated from the zooming ratio which gives the maximum correlation value if a relation between the zooming ratio and the distance at which the magnitude of the object image becomes equal to that of the reference pattern.

Thus, according to the first preferred embodiment of the present invention, there is provided an optical information processing apparatus capable of not only pattern-matching but also measuring a rotation angle of an object and a distance to the object.

Although the liquid crystal displays of electrically writable type are used for the first, second and third spatial light modulators in the present preferred embodiment, spatial light modulator such as light-writable liquid crystal devices, optical crystal devices such as BSO or the like may be used.

Other phase information which executes a logarithmic transformation, for example, can be employed in place of the phase information by a logarithmic polar coordinate transformation employed in the first preferred embodiment.

[Second preferred embodiment]

FIG. 3(a) is a block diagram of the optical information processing apparatus according to a second preferred embodiment of the present invention. Like reference numerals in FIG. 3(a) indicates like elements in FIG. 1(a).

In the second preferred embodiment, a memory 101 is provided for memorizing data of coordinate transformation computer generated holograms calculated beforehand for plural coordinate transformations using sampling points of respective pixels on the second liquid crystal display 6 and data of Fourier transformation computer generated holograms calculated beforehand for plural reference patterns using sampling points of respective pixels on the second liquid crystal display 6, namely voltage data to be applied corresponding to transmittances of respective pixels of the second liquid crystal display.

Reference numerals 102 and 103 are photo-electric transforming device arranged on the rear focal plane of the second lens 8 and a signal transformer for transforming an output signal from the photo-electric transforming device to a signal adapted to the first liquid crystal display 2, for instance, a non-interlace signal and inputting the same to the first liquid crystal display 2, respectively.

Figure 3B:
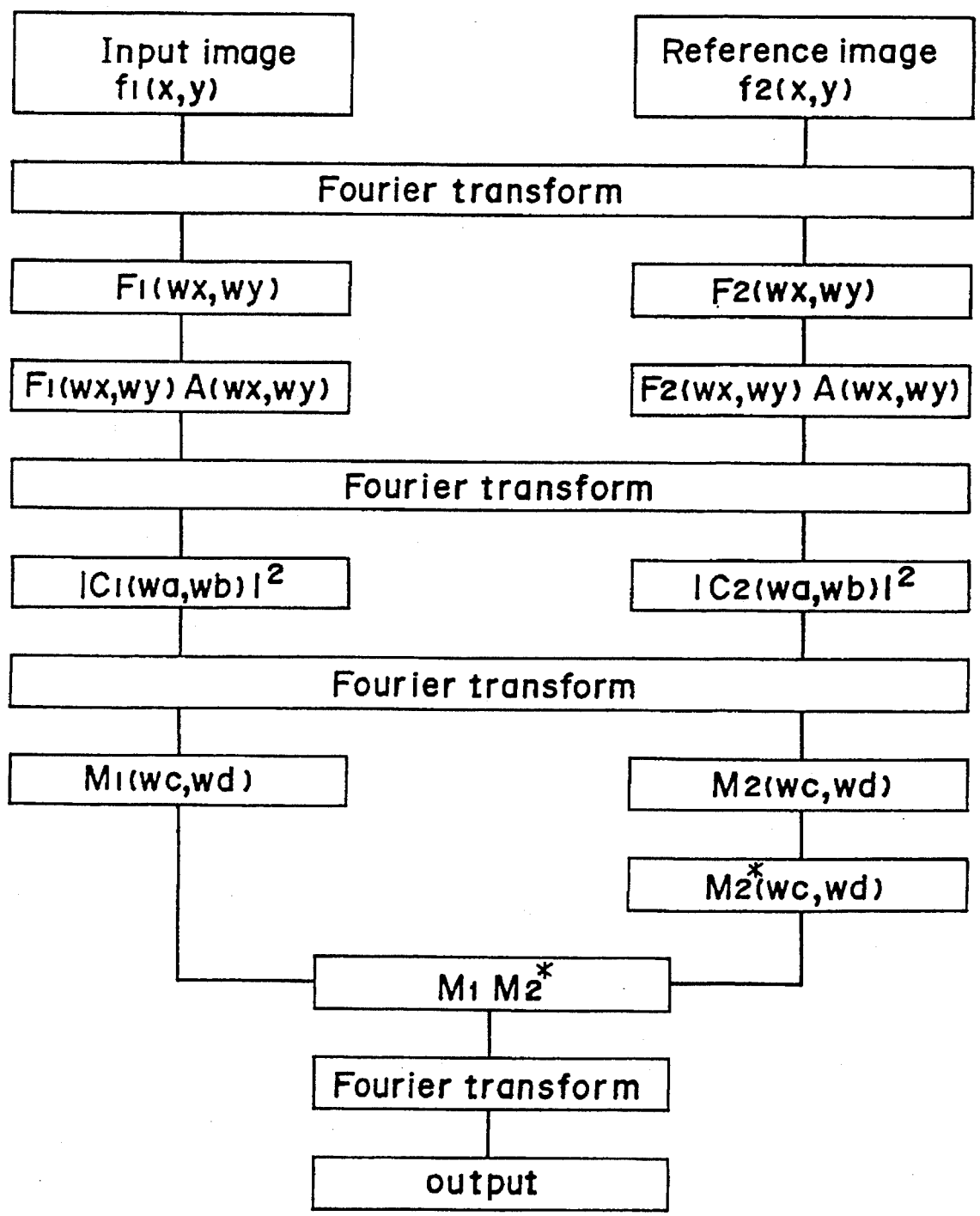
FIGS. 3(b) and 5(b) are flow charts showing operation to be executed in the second and fifth preferred embodiment, respectively.

In the optical information processing apparatus according to the second preferred embodiment, the operation thereof is explained with reference to a flow chart shown in FIG. 3(b).

At first, when the image of an object is picked up by the TV camera 1, the same image f1(x,y) is displayed on the first liquid crystal display 2.

This first liquid crystal display 2 is irradiated by a coherent light emitted from the laser diode 3 and collimated by the first collimator lens 4. Since it is arranged on the front focal plane of the first lens 5, a Fourier transformed image F1(wx,wy) of the object optically transformed by the first lens 5 (which corresponds to the first complex amplitude information) is formed on the rear focal plane of the first lens 5, namely, on the second liquid crystal display 6 by the first lens 5.

At the same time, on the second liquid crystal display 6, phase information $A(wx,wy)=\exp[2\pi i/(f_L\lambda)\{wx\ln(wx^2+wy^2)^{1/2}-wy\tan^{-1}(wy/wx)-wx\}]$, when a logarithmic polar coordinate transformation is performed, for example, is displayed in a form of a computer generated hologram by modulating transmittances of respective pixels of the second liquid crystal display 6 spatially using the data written into the first memory 7 as input signals.

In the above equation, $f_L$ denotes a focal length of the second lens 8 and $\lambda$ denotes a wavelength of the laser diode 3.

Accordingly, the Fourier transformed image F1(wx,wy) of the object displayed on the first liquid crystal display 2 and the phase information A(wx,wy) are superposed on the second liquid crystal display 6 and, thereby, third complex amplitude information F1(wx,wy) × A(wx,wy) is formed.

Further, since the second liquid crystal display 6 is arranged on the front focal plane of the second lens 8, the third complex amplitude information F1(wx,wy) × A(wx, wy) is optically Fourier-transformed by the second lens 8 and, thereby, an intensity distribution $|C1(wa, wb)|^2$ of a logarithmic polar coordinate-transformed image C1(wa,wb) of the Fourier-transformed image F1(wx,wy) of the object, which corresponds to fifth complex amplitude information, is detected by the photoelectric transfer device 102 arranged on the rear focal plane of the second lens 8. This is displayed on the first liquid crystal display 2 by the signal transforming means 103.

Further, the first liquid crystal display 2 is irradiated by a coherent light and the intensity distribution $|C1(wa, wb)|^2$ is optically Fourier-transformed by the first lens 5. Thereby, seventh complex amplitude information M1(wc, wd) is formed on the second liquid crystal display 6.

At the same time, on the second liquid crystal display 6, a complex conjugate M2*(wc,wd) of eighth complex amplitude information M2(wc,wd) which is formed by the computer beforehand is displayed.

Next, a method for forming the eighth complex amplitude information will be described.

At first, a reference image f2(x,y) is formed by fetching the same from the TV camera to the computer or by the computer. Then, second complex amplitude information F2(wx,wy) is formed by Fourier-transforming f2(x, y) by the computer using FFT or the like. Next, after forming fourth complex amplitude information F2(wx,wy) × A(wx,wy) by superposing the phase information A(wx,wy) and second complex amplitude information F2(wx,wy), sixth complex amplitude information C2(wa,wb) is formed by Fourier-transforming the fourth complex amplitude information. Then, the absolute value of the sixth amplitude information is Fourier-transformed again to form eighth complex amplitude information M2(wc,wd).

The method for displaying the complex conjugate M2*(wc,wd) of the eighth complex amplitude information on the second liquid crystal display is similar to the first preferred embodiment.

The complex conjugate M2*(wc,wd) of the eighth complex amplitude information and the seventh complex amplitude information M1(wc,wd) are superposed on the second liquid crystal display 9 and, thereby, ninth complex amplitude information M1(wc,wd) × M2*(wc,wd) is formed.

Further, the ninth complex amplitude information M1(wc, wd) × M2*(wc,wd) on the second liquid crystal display 6 is Fourier-transformed by the second lens 8. Accordingly, a correlation calculation between intensity distributions of the fifth and the sixth complex amplitude information $|C1(wa, wb)|^2$ and $|C2(wa, wb)|^2$ is performed optically, as is known as the correlation principle of the Fourier-transform, the result thereby is detected by a photoelectric transforming device 102.

Thus, substantially the same effects as those of the first preferred embodiment are obtained by this preferred embodiment.

Further, according to this preferred embodiment, the third lens 9, the third liquid crystal display 10, the second memory 11 and the fourth lens 12 of the first preferred embodiment can be omitted since the coordinate-transformed images are displayed on the first liquid crystal display 2 using the photoelectric transforming device 102 and the signal transforming means 103. Thus, the length of the optical path becomes one half that of the first preferred embodiment and, therefore, a compact and light-weight optical information processing apparatus can be obtained.

[Third preferred embodiment]

Figure 4:
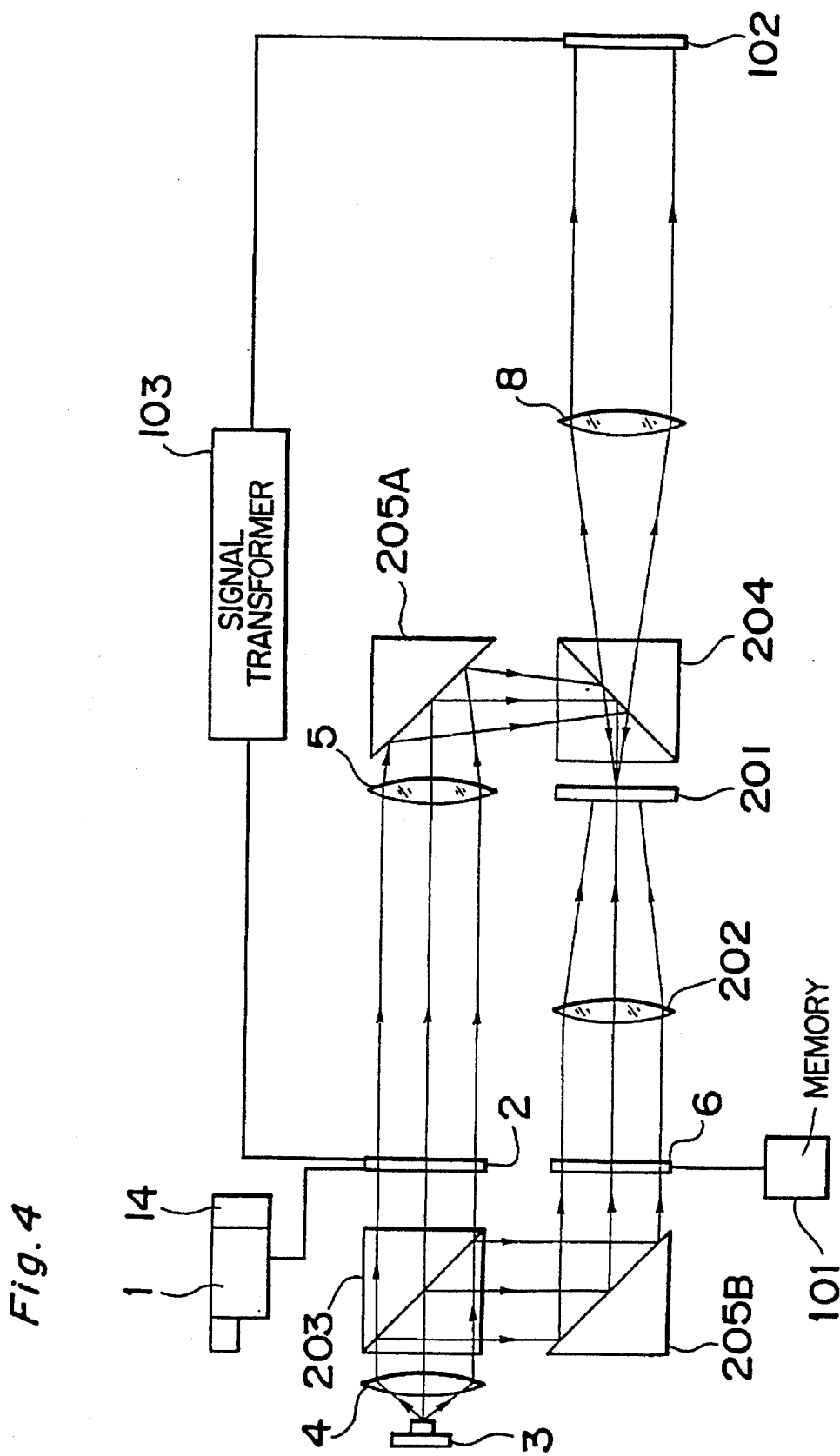

FIG. 4 is a block diagram of a third preferred embodiment of the present invention. Like reference numerals in FIG. 4 denote like elements in FIG. 3(a).

In FIG. 4, reference numerals 201,202,203,204 and 205 indicate a third spatial light modulator using a light refractive material, a third contraction projection lens, a first beam splitter, a second beam splitter and an optical path switching mirror, respectively. The first liquid crystal display 2 is arranged on the front focal plane of the first lens 5 and the spatial light modulator 201 is arranged on the rear focal plane of the first lens 5. Further, the second lens 8 is arranged so as for the front focal plane thereof to coincide with the rear focal plane of the first lens 5 and the photo-electric transforming device 102 is arranged on the rear focal plane of the second lens 8.

The operation of the optical information processing apparatus according to the third preferred embodiment is explained below with reference to a flow chart shown in FIG. 3(b).

At first, when the image of an object is picked up by the TV camera 1, the same image f1(x,y) is displayed on the first liquid crystal display 2.

This first liquid crystal display 2 is irradiated by a coherent light emitted from the laser diode 3 and collimated by the collimator lens 4. Since it is arranged on the front focal plane of the first lens 5, a Fourier-transformed image F1 (wx,wy) of the object optically transformed by the first lens 5 (which corresponds to first complex amplitude information) is formed on the rear focal plane of the first lens 5, namely, on the spatial light modulator 201 by the first lens 5.

At the same time, on the second liquid crystal display 6, phase information $A(wx,wy)=\exp[2\pi i/(f_L\lambda)\{wx\ln(wx^2+wy^2)^{1/2}-wy\tan^{-1}(wy/wx)-wx\}]$, when a logarithmic polar coordinate transformation is performed, for example, is displayed in a form of a computer generated hologram by modulating transmittances of respective pixels of the second liquid crystal display 6 spatially using the data written into the first memory 101 as input signals.

In the above equation, $f_L$ denotes a focal length of the second lens 8 and $\lambda$ denotes a wavelength of the laser from the laser diode 3.

This second liquid crystal display 6 is irradiated by a collimated light splitted by the first beam splitter which is arranged behind the collimator lens 4 and the image A (wx,wy) on the display 6 is projected onto the spatial light modulator 201 by the third lens 202 in a form of a spatial distribution of the reflectivity.

Accordingly, the Fourier transformed image F1(wx,wy) of the object displayed on the first liquid crystal display 2 and the phase information A(wx,wy) are superposed on the spatial light modulator 201 and, thereby, third complex amplitude information F1(wx,wy) × A(wx,wy) is formed.

Further, since the spatial light modulator 201 is arranged on the front focal plane of the second lens 8, the third complex amplitude information F1(wx,wy) × A(wx,wy) is optically Fourier-transformed by the second lens 8 and, thereby, an intensity distribution |C1(wa,wb)|² of a logarithmic polar coordinate transformed image C1(wa,wb) of the Fourier-transformed image F1(wx,wy) of the object, which corresponds to fifth complex amplitude information, is detected by the photoelectric transforming device 201 arranged on the rear focal plane of the second lens 8. This is displayed on the first liquid crystal display 2 by the signal transforming means 103.

Further, the first liquid crystal display 2 is irradiated by a coherent light and |C1(wa,wb)|² is optically Fourier-transformed by the first lens 5 and, thereby, seventh complex amplitude information M1(wc,wd) is formed on the spatial light modulator 201.

At the same time, on the second liquid crystal display 6, a complex conjugate M2*(wc,wd) of eighth complex amplitude information M2(wc,wd) which is formed by the computer beforehand is displayed (the method for forming and displaying the eighth complex amplitude information is similar to the second preferred embodiment).

Also, the second liquid crystal display 6 is irradiated by a collimated light splitted by the first beam splitter 203 which is arranged behind the collimator lens 4 and the image M2*(wc,wd) on the second liquid crystal display 6 is projected onto the spatial light modulator 201 in a form of a spatial distribution of the reflectivity thereof.

Thus, the complex conjugate M2*(wc,wd) of the eighth complex amplitude information and the seventh complex amplitude information M1(wc,wd) are superposed on the spatial light modulator 201 to form ninth complex amplitude information M1(wc,wd) × t × M2*(wc,wd).

Further, the ninth complex amplitude information is optically Fourier-transformed by the second lens 8. Accordingly, as is well known as the correlation principle of the Fourier-transform, a correlation calculation between |C1(wa,wb)|² and |C2(wa,wb)|² is performed optically and the result thereby is detected by the photoelectric transformer 102.

According to this preferred embodiment, effects substantially the same as those of the second preferred embodiment can be obtained.

Further, it becomes possible to raise the spatial density of pixels of the liquid crystal display substantially in the present embodiment since the image on the second liquid crystal display 6 written into the spatial light modulator 201 after contracting the same by the third lens 202. This means that it is possible to realize a matched filter, including higher frequency components then those in the first and second preferred embodiments on the spatial light modulator 201. In other words, the present preferred embodiment can provide an optical information processing device capable of discriminating an object having a much finer structure when compared with the foregoing preferred embodiments.

[Fourth preferred embodiment]

Figure 5A:
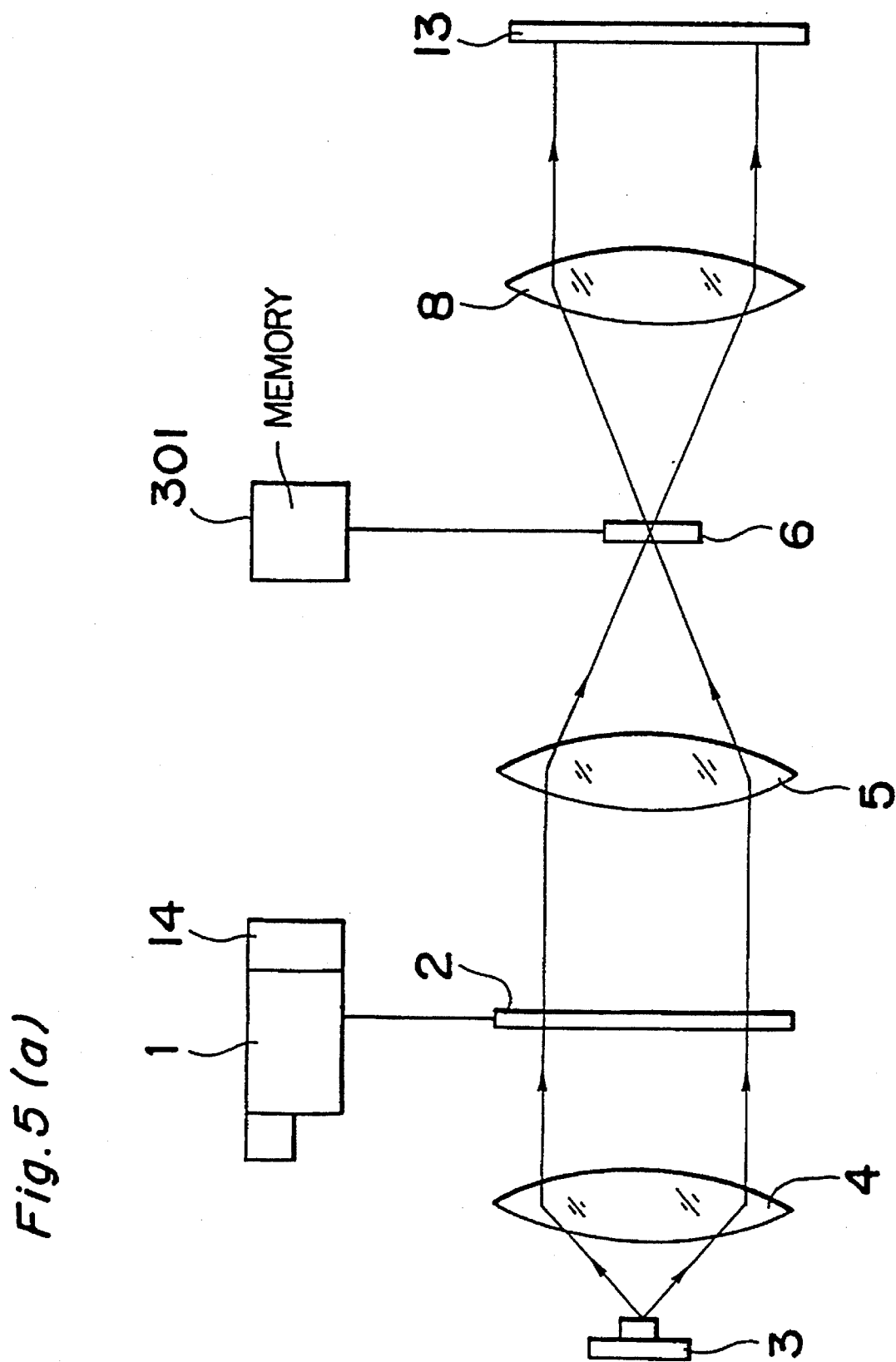

FIG. 5(a) is a block diagram for showing a fourth preferred embodiment of the present invention wherein like reference numerals denote like elements illustrated in FIG. 3(a).

In this preferred embodiment, there is provided a memory 301 which memorizes data of a computer generated hologram calculated on the basis of data obtained by producing phase information for performing a coordinate transformation by complex amplitude information obtained by Fourier-transforming a coordinate-transformed image of a Fourier-transformed image of a reference pattern, namely voltage data to be applied corresponding to transmittances of respective pixels of the second liquid crystal display 2.

Figure 5B:
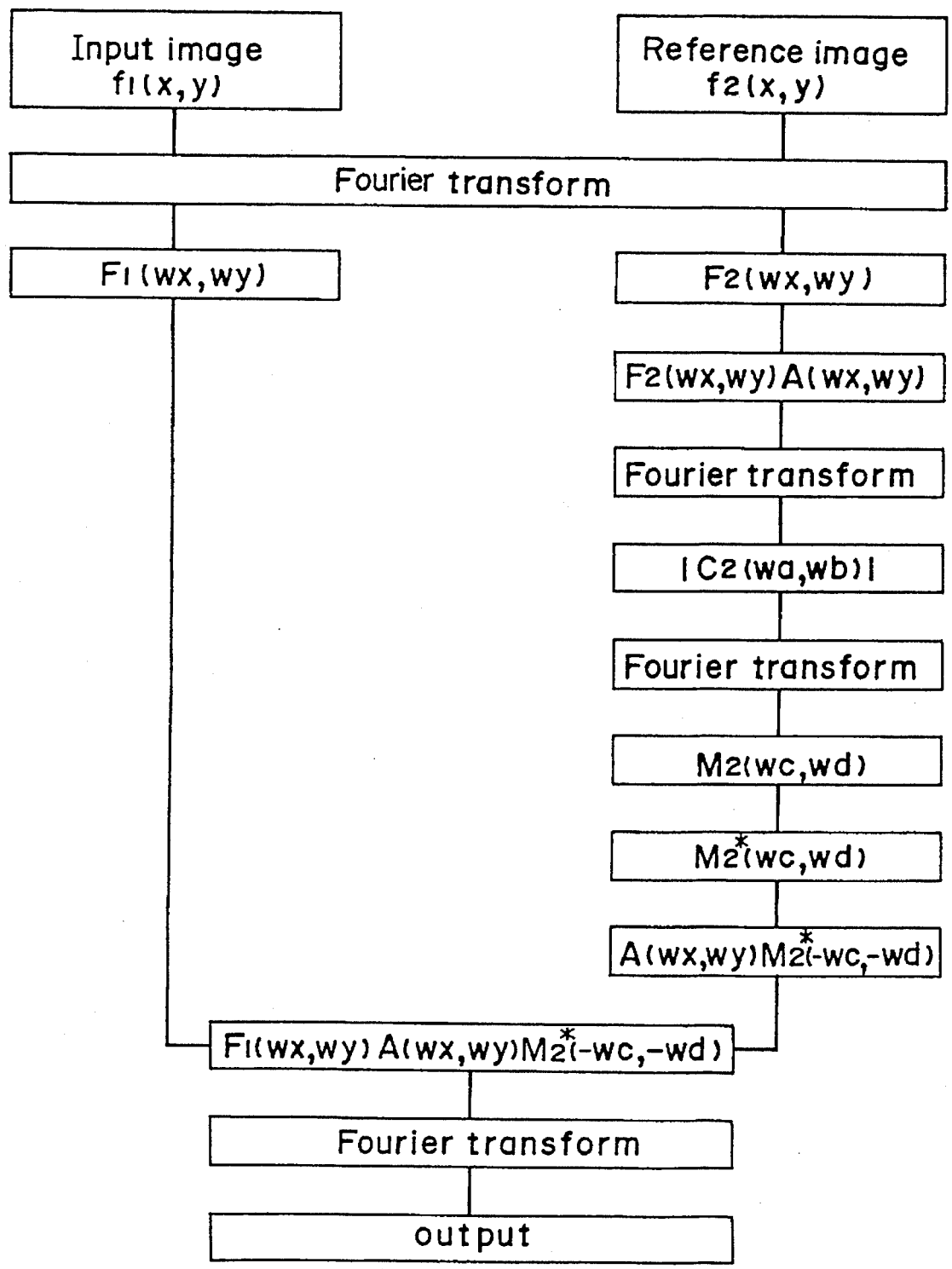

The operation of the optical information processing apparatus according to the fourth preferred embodiment of the invention is explained below with reference to a flow chart shown in FIG. 5(b).

At first, when the image of an object is picked up by the TV camera 1, the same image f1(x,y) is displayed on the first liquid crystal display 2.

This first liquid crystal display 2 is irradiated by a coherent light emitted from the laser diode 3 and collimated by the first collimator lens 4. Since it is arranged on the front focal plane of the first lens 5, a Fourier transformed image F1 (wx,wy) of the object optically transformed by the first lens 5 (which corresponds to first complex amplitude information as claimed in claim 12) is formed on the rear focal plane of the first lens 5, namely on the second liquid crystal display 6 by the first lens 5.

At the same time, on the second liquid crystal display 6, sixth complex amplitude information M2*(-wc,-wd) × A(wx,wy) formed by a computer beforehand is displayed.

Next, a method for forming the sixth complex amplitude information is explained.

At first, a reference image f2(x,y) is formed by fetching the same from the TV camera to the computer or by the computer. Then, second complex amplitude information F2(wx,wy) is formed by Fourier-transforming f2(x, y) by the computer using FFT or the like. Next, after forming third complex amplitude information F2(wx,wy) × A(wx,wy) by superposing the phase information A(wx,wy) = exp[$2\pi i$/($f_L\lambda$){wxln(wx$^2$ + wy$^2$)$^{1/2}$− wy tan$^{-1}$(wy/wx) − wx}]and second complex amplitude information F2(wx,wy), fourth complex amplitude information C2(wa,wb) is formed by Fourier-transforming the third complex amplitude information. Then, the absolute value of the fourth amplitude information is Fourier-transformed again to form fifth complex amplitude information M2(wc,wd).

Further, an inverted image M2*(-wc,-wd) of a complex conjugate to the fifth complex amplitude information and the phase information A(wx,wy) are superposed to form sixth complex amplitude information M2*(-wc,-wd) x A(wx,wy). Then, a computer generated hologram is formed based on the sixth complex amplitude information and displayed on the second liquid crystal display 6.

The sixth complex amplitude information M2*(-wc,wd) × A(wx,wy) and the Fourier-transformed image F1(wx,wy) are superposed on the second liquid crystal display 6 to form seventh complex amplitude information F1(wx,wy) × A(wx, wy) × M2*(-wc,-wd).

Since the second liquid crystal display 6 is arranged on the front focal plane of the second lens 8, the seventh complex amplitude information is optically Fourier-transformed by the second lens 8 and the result thereby is detected by a photodetector 13 arranged on the rear focal plane of the second lens 8.

The seventh complex amplitude information according to the present preferred embodiment has a relationship with the first preferred embodiment as follows.

Since the fifth complex amplitude information is obtained by Fourier-transforming the third complex amplitude information two times, it is represented by the following equation.

$$M1(wa,wb) = FT[FT(F1(wx,wy) \times A(wx,wy)]$$
$$= F1(-wx, -wy) \times A(-wx, -wy)$$

wherein symbol FT indicates a Fourier-transform. Alternatively, the seventh complex amplitude information can be rewritten as follows.

$$F1(wx,wy) \times A(wx,wy) \times M2^*(-wc, -wd) =$$
$$M1(-wa, -wb) \times M2^*(-wc, -wd)$$

Comparing these two equations, it is understood that the seventh complex amplitude information of the present preferred embodiment is an inverted image of the ninth complex amplitude information of the first preferred embodiment. Accordingly, it becomes possible to perform a correlation calculation optically in a logarithmic polar coordinate space of a spatial frequency region by Fourier-transforming the seventh complex amplitude information similarly to the first preferred embodiment.

According to the fourth preferred embodiment, all of the effects obtained by the first and second preferred embodiments can be obtained.

Further, since no signal transforming means is needed in the fourth preferred embodiment and it is not necessary to redisplay the coordinate-transformed image of the Fourier-transformed image of an object image on the first liquid crystal display 6, there is provided an optical information processing apparatus having a fast processing time.

Although F1(wX,Wy) and M2*(-wc,-wd) x A(-wx,-wy) are employed as the first and sixth complex amplitude information in the present embodiment, respectively, F1(-wx,-wy) and M2*(wc,wd) × A(-wx,-wy) can be employed as the first and six complex amplitude information.

[Fifth preferred embodiment]

Figure 6:
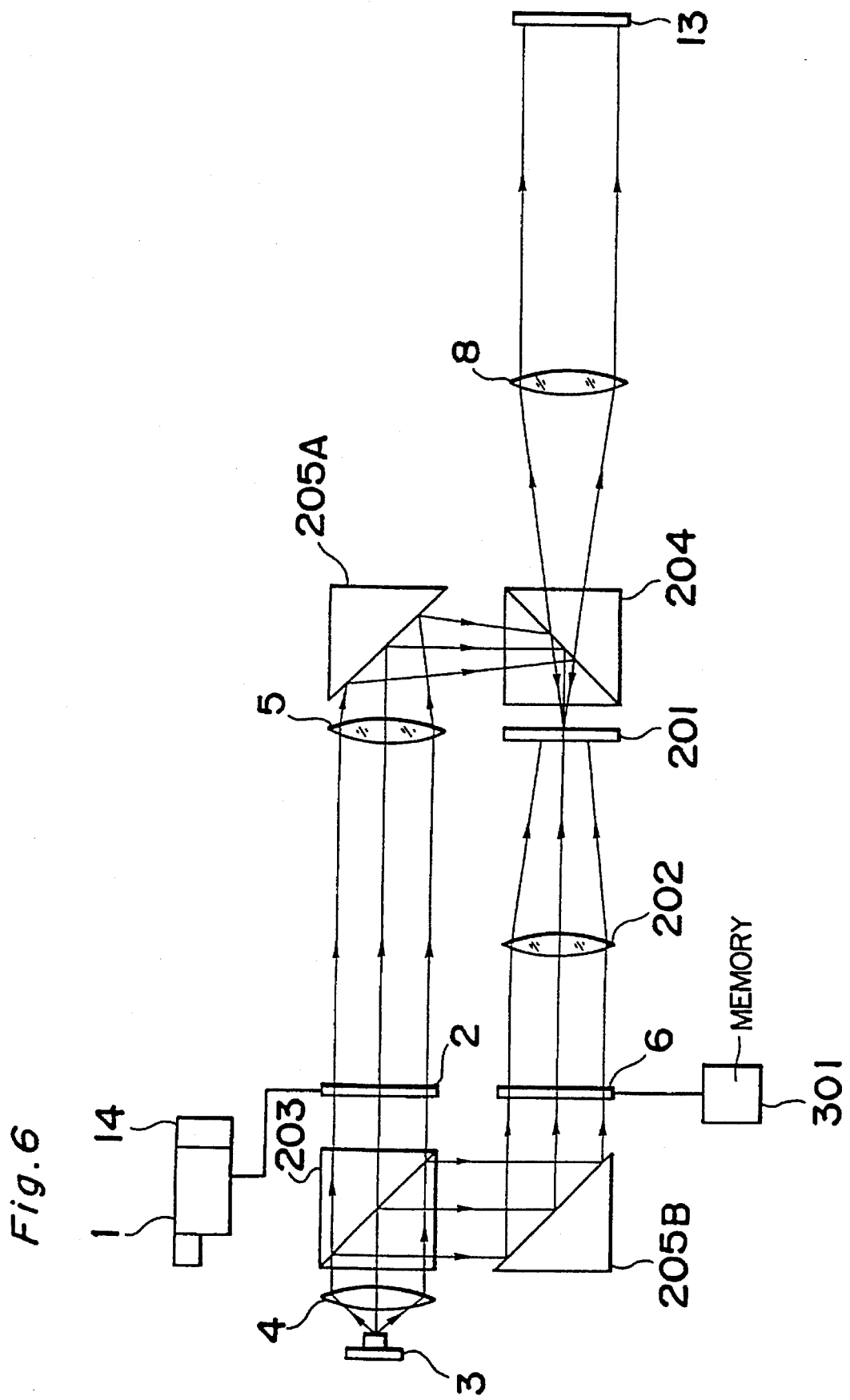
Figure 7:
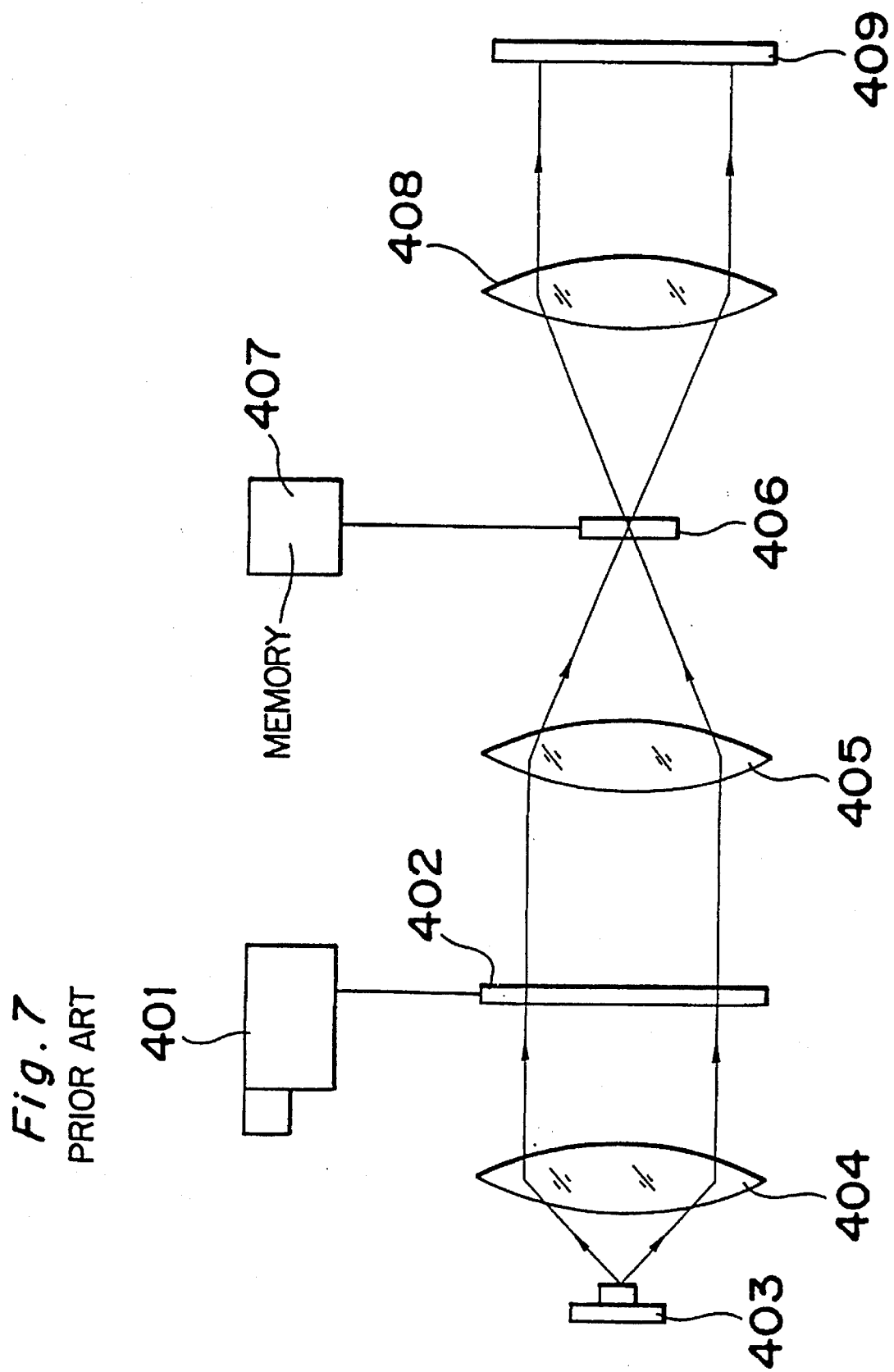
FIG. 7 is a block diagram showing a conventional optical information processing apparatus.
Figure 8A:
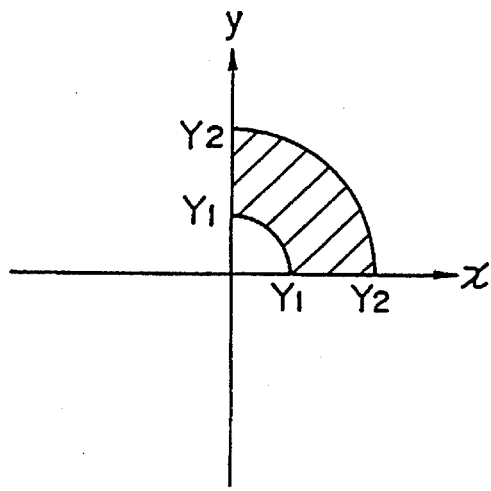
FIGS. 8(a), 8(b), 8(c) and 8(d) show variations of input images having one origin.
Figure 8B:
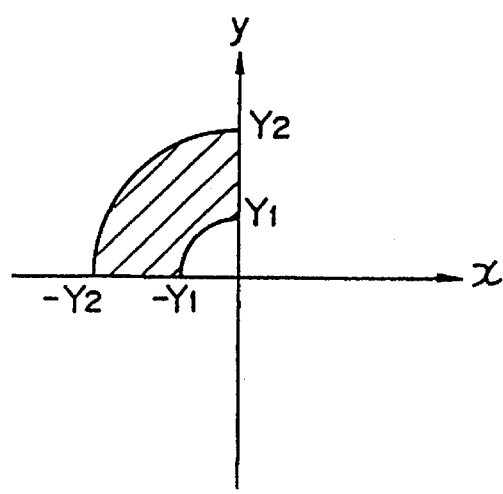
Figure 8C:
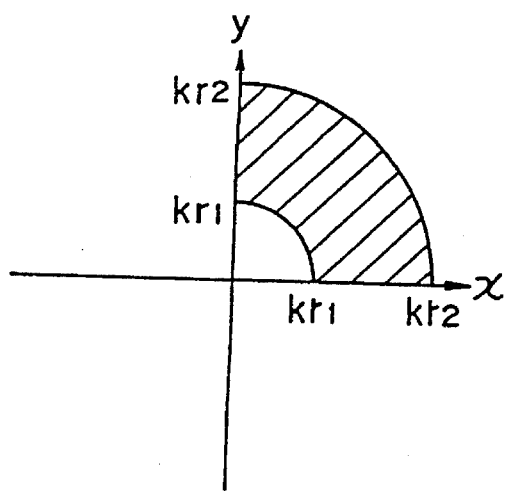
Figure 8D:
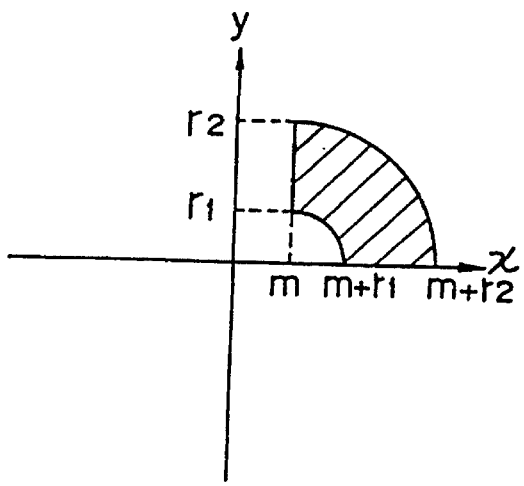
Figure 9A:
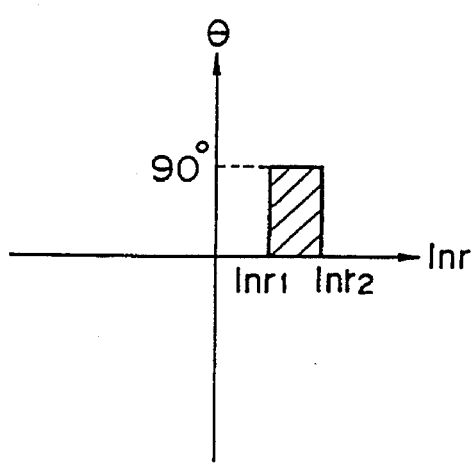
FIGS. 9(a), 9(b), 9(c) and 9(d) show coordinate-transformed images of respective input images shown in FIGS. 8(a)–8(d).
Figure 9B:
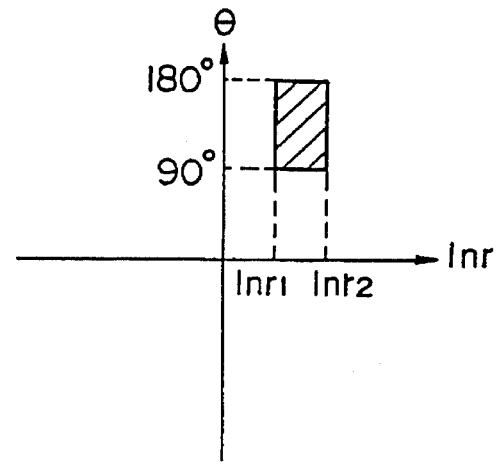
Figure 9C:
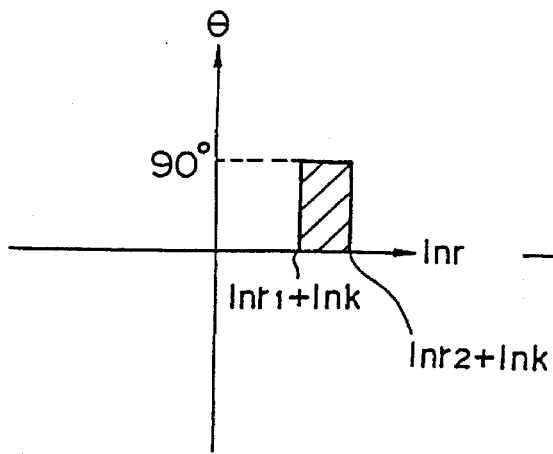
Figure 9D:
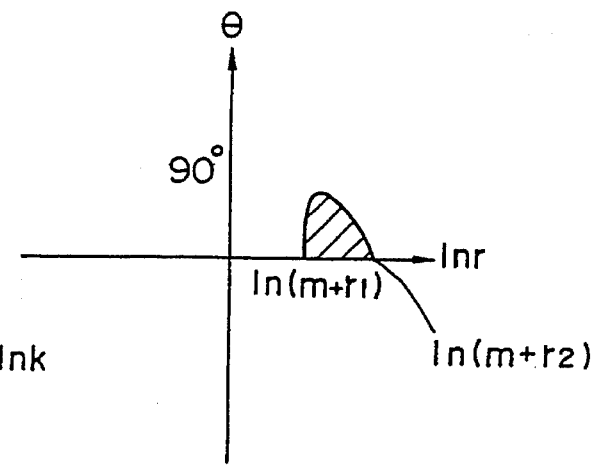

FIG. 6 is a block diagram showing a fifth preferred embodiment of the invention wherein like reference numerals denote like elements illustrated in FIG. 4.

This fifth preferred embodiment provides a memory 301 memorizing data for controlling the second liquid crystal display 6 instead of the memory 101 and the signal transforming means 103 of the third preferred embodiment illustrated in FIG. 4.

The memory 301 memorizes the data substantially the same as those used in the fourth preferred embodiment of the present invention.

The operation of the optical information processing apparatus according to the fifth preferred embodiment is explained below with reference to the flow chart shown in FIG. 5(b).

At first, when the image of an object is picked up by the TV camera 1, the same image f1(x,y) is displayed on the first liquid crystal display 2.

This first liquid crystal display 2 is irradiated by a coherent light emitted from the laser diode 3 and collimated by the collimator lens 4. Since it is arranged on the front focal plane of the first lens 5, a Fourier-transformed image F1(wx,wy) of the object optically transformed by the first lens 5 (which corresponds to the first complex amplitude information) is formed on the rear focal plane of the first lens 5, namely, on the spatial light modulating device 201.

At the same time, on the second liquid crystal display 6, sixth complex amplitude information M2*(-wc,-wd) × A(wx,wy) which is formed by a computer beforehand is displayed. The method for forming and displaying the sixth complex amplitude information is similar to the fourth preferred embodiment.

The second liquid crystal display 6 is irradiated by a collimated light which is split by the first beam splitter 203 arranged behind the collimator lens 4 and the image displayed thereby is projected onto the spatial light modulator 201 by the third lens 202 so that the computer generated hologram M2*(-wc,-wd) × A(wx,wy) on the second display 2 is written in a form of a spatial distribution of the reflectivity thereof.

Accordingly, the Fourier-transformed image F1(wx,wy) of the object displayed on the first liquid crystal display 2 and the sixth complex amplitude are superposed on the spatial light modulator 201 to form seventh complex amplitude information F1(wx,wy) × A(wx,wy) × M2*(-wc,-wd). Since the spatial light modulator 201 is arranged on the front focal plane of the second lens 8, the seventh complex amplitude information is optically Fourier-transformed by the second lens 8 and the result thereby is detected by the photodetector 13 arranged on the rear focal plane of the second lens 8.

Accordingly, as in the fourth preferred embodiment, a correlation calculation can be performed optically in a logarithmic polar coordinate space of a spatial frequency region.

According to this preferred embodiment of the present invention, all the effects obtained by the foregoing preferred embodiment can be also obtained.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical information processing apparatus comprising:

an input means for inputting an image of an object;

a first spatial light modulator for displaying an input image;

a light source for irradiating said first light modulator;

a first lens means arranged so as for its front focal plane to coincide with the plane on which said first spatial light modulator is arranged, said first lens means Fourier-transforming the input image displayed on said first spatial light modulator and irradiated by said light source;

a first memory means for storing a coordinate transforming computer generated hologram for performing a rotation-invariant and scale-invariant coordinate transform;

a second spatial light modulator arranged on the rear focal plane of said first lens for superposing the image Fourier-transformed by said first hens means with said coordinate transforming computer generated hologram having been stored in said first memory;

a second lens means arranged so as for its front focal plane to coincide with the rear focal plane of said first lens means, said second lens means Fourier-transforming the superposed image, thereby obtaining a rotation-invariant and scale-invariant Fourier-transformed image;

a third lens means arranged so as for its front focal plane to coincide with the rear focal plane of said second lens means, said third lens means Fourier-transforming the image Fourier-transformed by said second lens means;

a second memory for storing computer generated holograms of reference images each obtained by Fourier-transforming a reference image, rotation-invariant and scale-invariant coordinate transforming the Fourier-transformed reference image, calculating an absolute value of the coordinate-transformed image, and Fourier-transforming the absolute value;

a third spatial light modulator arranged on the rear focal plane of said third lens means for superposing the image Fourier-transformed by said third lens means and a complex conjugate of a computer generated hologram having been stored in said second memory;

a fourth lens means arranged so as for its front focal plane to coincide with the plane of said third spatial light modulator, said fourth lens means Fourier-transforming an image obtained by superposing the image Fourier-transformed by said third lens means to said computer generated hologram displayed on said third spatial light modulator; and a photo detecting means arranged on the rear focal plane of said fourth lens means which receives the image Fourier-transformed by said fourth lens means to detect whether or not the input image coincides with the reference image.

2. The optical information processing apparatus as claimed in claim 1, wherein each of said first to third spatial light modulators is comprised of a liquid crystal display.

3. An optical information processing apparatus comprising:

an input means for inputting an image of an object;

a first spatial light modulator for displaying an input image;

a light source for irradiating said first light modulator;

a first lens means arranged so as for its front focal plane to coincide with the plane on which said first spatial light modulator is arranged, said first lens means Fourier-transforming the input image displayed on said first spatial light modulator and irradiated by said light source;

a memory means for storing a coordinate transforming computer generated hologram and a plurality of computer generated holograms of reference images, said coordinate transforming computer generated hologram for performing a rotation-invariant and scale-invariant coordinate transform and each of said plurality of computer generated holograms of reference images being obtained by Fourier-transforming a reference image, rotation-invariant and scale-invariant coordinate transforming the Fourier-transformed reference image, calculating a square of an absolute value of the coordinate-transformed image, Fourier-transforming the square of an absolute value of the coordinate-transformed image:

a second spatial light modulator arranged on the rear focal plane of said first lens means for selectively displaying said coordinate transforming computer generated hologram and a complex conjugate of one of said plurality of computer generated holograms of reference images;

a second lens means arranged so as for its front focal plane to coincide with the rear focal plane of said first lens means, said second lens means Fourier-transforming the image superposed on said second spatial light modulator;

a photoelectric transforming device arranged on the rear focal plane of said second lens means, which detects an intensity distribution of the image Fourier-transformed by said second lens means; and a signal transforming means for transforming an output signal of said photoelectric transforming device and inputting the transformed signal to said first spatial light modulator to display the intensity distribution detected by said photoelectric transforming device thereon, wherein the input image of an object displayed on said first spatial light modulator and Fourier-transformed by said first lens means is superposed with said coordinate transforming computer-generated hologram stored in said memory means on said second spatial light modulator, thereby being transformed to a rotation-invariant and scale-invariant image, an intensity distribution of the rotation-invariant and scale-invariant image, after being Fourier-transformed by said second lens means, is detected by said photoelectric transforming device, the detected intensity distribution is displayed on said first spatial light modulator via said signal transforming means and, after being Fourier-transformed by said first lens means, is superposed with said complex conjugate of one of computer-generated holograms of reference images stored in said memory meads on said second spatial light modulator, the superposed image, after being Fourier-transformed by said second lens means, is detected by said photoelectric transforming device, thereby obtaining a result of pattern matching between the input image of an object and the reference pattern.

4. The optical information processing apparatus as claimed in claim 3, wherein each of said first and second spatial light modulators is comprised of a liquid crystal display.

5. An optical information processing apparatus comprising:

an input means for inputting an image of an object;

a first spatial light modulator for displaying an input image;

a light source for irradiating said first light modulator;

a first lens means arranged so as for its front focal plane to coincide with the plane on which said first spatial light modulator is arranged, said first lens means Fourier-transforming the input image displayed on said first spatial light modulator and irradiated by said light source;

a second spatial light modulator of a light writing type arranged on the rear focal plane of said first lens means on one side of which the image Fourier-transformed by said first lens means is written;

a memory means for storing a coordinate transforming computer generated hologram and a plurality of computer generated holograms of reference images, said coordinate transforming computer generated hologram being for performing a rotation-invariant and scale-invariant coordinate transform and each of said plurality of computer generated holograms of reference images being obtained by Fourier-transforming a reference image, rotation-invariant and scale-invariant coordinate transforming the Fourier-transformed reference image, calculating a square of an absolute value of the coordinate-transformed image, Fourier-transforming the square of an absolute value of the coordinate-transformed image;

a third spatial light modulator for selectively displaying the coordinate transforming computer generated hologram and said plurality of computer generated holograms having been stored in said memory;

a second lens means for projecting a condensed image of an image displayed on the other side of said second spatial light modulator, thereby superposing the Fourier-transformed input image and the image displayed on said third spatial light modulator;

a third lens means arranged so as for its front focal plane to coincide with the rear focal plane of said first lens means, said third lens means Fourier-transforming the image superposed on said second spatial modulator;

a photoelectric transforming device arranged on the rear focal plane of said second lens means, which detects an intensity distribution of the image Fourier-transformed by said third lens means; and a signal transforming means for transforming an output signal of said photoelectric transforming device and inputting the transformed signal to said first spatial light modulator to display the intensity distribution detected by said photoelectric transforming device thereon, wherein the intensity distribution displayed on said first spatial light modulator is Fourier-transformed by said first lens means, the Fourier-transformed intensity distribution is superposed with said one of plurality of computer generated holograms on said second spatial light modulator, the superposed image is Fourier-transformed by said third lens means and the Fourier-transformed superposed image is detected by said photoelectric transforming device.

6. The optical information processing apparatus as claimed in claim 5, wherein each of said first to third spatial light modulators is comprised of a liquid crystal display.

7. An optical information processing apparatus comprising:

an input means for inputting an image of an object;

a first spatial light modulator for displaying an input image;

a light source for irradiating said first light modulator;

a first lens means arranged so as for its front focal plane to coincide with the plane on which said first spatial light modulator is arranged, said first lens means Fourier-transforming the input image displayed on said first spatial light modulator and irradiated by said light source;

a memory means for storing a plurality of computer generated holograms related to reference images to be compared with an input image, each of said plurality of computer generated holograms being obtained by Fourier-transforming a reference image, rotation-invariant and scale-invariant coordinate transforming the Fourier-transformed reference image, calculating an absolute value of the coordinate-transformed image, Fourier-transforming the absolute value, taking a complex conjugate of the Fourier-transformed absolute value, inverting polarities of spatial frequencies with respect to the complex conjugate, and superposing phase information for rotation-invariant and scale-invariant transforming to the inverted complex conjugate;

a second spatial light modulator arranged on the rear focal plane of said first lens which optically superposes the Fourier-transformed input image and one of said plurality of computer generated holograms having been stored in said memory;

a second lens means arranged so as for its focal plane to coincide with the rear focal plane of said first lens means, said second lens means Fourier-transforming the image superposed on said second spatial light modulator; and a photo detecting means arranged on the rear focal plane of said fourth lens means, which detects an intensity distribution of the image Fourier-transformed by said second lens means.

8. The optical information processing apparatus as claimed in claim 7, wherein each of said first and second spatial light modulators is comprised of a liquid crystal display.

9. An optical information processing apparatus comprising:

an input means for inputting an image of an object;

a first spatial light modulator for displaying an input image;

a light source for irradiating said first light modulator;

a first lens means arranged so as for its front focal plane to coincide with the plane on which said first spatial light modulator is arranged, said first lens means Fourier-transforming the input image displayed on said first spatial light modulator and irradiated by said light source;

a second spatial light modulator of a light writing type arranged on the rear focal plane of said first lens means on one side of which the image Fourier-transformed by said first lens means is written;

a memory means for storing a plurality of computer generated holograms related to reference images to be compared with an input image, each of said plurality of computer generated holograms being obtained by Fourier-transforming a reference image, rotation-invariant and scale-invariant coordinate transforming the Fourier-transformed reference image calculating an absolute value of the coordinate-transformed image, Fourier-transforming the absolute value, taking a complex conjugate of the Fourier-transformed absolute value, inverting polarities of spatial frequencies with respect to the complex conjugate, and superposing phase information for rotation-invariant and scale-invariant transforming to the inverted complex conjugate;

a third spatial light modulator for displaying one of said plurality of computer generated holograms having been stored in said memory, thereby superposing the Fourier-transformed input image and one of said plurality of computer generated holograms on said second spatial modulator;

a second lens means for projecting a condensed image of an image displayed on said third spatial light modulator onto the other side of said second spatial light modulator;

a third lens means arranged so as for its focal plane to coincide with the plane on which said second spatial modulator is arranged for Fourier-transforming the image superposed on said second spatial modulator; and a photoelectric transforming device arranged on the rear focal plane of said third lens means, which detects an intensity distribution of the image Fourier-transformed by said third lens means.

10. The optical information processing apparatus as claimed in claim 9, wherein each of said first to third spatial light modulators is comprised of a liquid crystal display.

\* \* \* \* \*